United States Patent [19]

Gautherin et al.

[11] Patent Number: 4,772,995

[45] Date of Patent: Sep. 20, 1988

[54] SWITCHING SUPPLY WITH PULSE WIDTH AND RATE MODULATION

[75] Inventors: George Gautherin, Huntington; Sol Greenberg, Roslyn, both of N.Y.

[73] Assignee: Veeco Instruments Inc., Melville, N.Y.

[21] Appl. No.: 1,346

[22] Filed: Jan. 8, 1987

[51] Int. Cl.[4] .......................................... H02M 3/335
[52] U.S. Cl. ..................................... 363/21; 323/288; 363/97
[58] Field of Search ............................ 363/21, 26, 97; 323/288; 307/265

[56] References Cited

U.S. PATENT DOCUMENTS

| 4,037,271 | 7/1977 | Keller | 363/21 |
|---|---|---|---|
| 4,276,586 | 6/1981 | Boekhorst | 363/21 |
| 4,347,559 | 8/1982 | Sturgeon | 363/21 |
| 4,479,174 | 10/1984 | Cates | 363/21 |
| 4,677,534 | 6/1987 | Okochi | 363/21 |
| 4,679,131 | 7/1987 | Filliman | 323/288 |

FOREIGN PATENT DOCUMENTS

| 72446 | 6/1979 | Japan | 323/288 |
|---|---|---|---|
| 97183 | 7/1980 | Japan | 363/21 |

Primary Examiner—William H. Beha, Jr.
Attorney, Agent, or Firm—Morgan & Finnegan

[57] ABSTRACT

A switching type power supply is described which employs pulse width and rate modulation. Enhanced control range is achieved by controlling a frequency determining circuit to increase operating frequency as a function of power switch pulse width. The power switch controls the switching of primary current in a transformer whose secondary supplies the output via a rectifier/filter circuit.

6 Claims, 2 Drawing Sheets

SWITCHING SUPPLY WITH PULSE WIDTH AND RATE MODULATION

TECHNICAL FIELD

This invention relates to regulated electronic power supplies and particularly to those of the switching type.

PRIOR ART

Control systems for switching power supplies generally fall into two categories:
1. pulse width modulation (PWM);
2. rate control systems.

In PWM systems, the ratio of conduction time to base time is varied to provide control. Rate control systems are based on the principle of fixed or limited energy per cycle. Their method of operation is sometimes referred to as frequency modulation or rate modulation.

For frequency or rate modulation, the energy transmitted per cycle multiplied by the repetition rate determines the product of output voltage and output current delivered to the load. The output voltage is obtained by dividing the volt-current product by the load current.

For pulse width modulation, the output d.c. voltage is represented by the volt-time product of the voltage applied to an averaging filter divided by the cycle period. For pulse width modulation, and assuming a normalized transformer turns ratio (1:1) and a square wave transmission of voltage, the output voltage (neglecting diode and wiring losses) is:

$$V_{dc} = V_p \frac{t\text{-}on}{T_p} = V_{average} \quad (1)$$

where t-on is the switch conduction time $V_p$ is the switched source voltage, and $T_p$ is the sum of t-on and t-off. $T_p$ is the time base or base period and is the reciprocal of the operating frequency.

In a simple pulse-width modulation system, be it a balanced system or single ended configuration, the maximum power transmission period of a power switch is commonly restricted to about $\frac{1}{2}$ $T_p$. For a switching supply operating at 20 KHz, t-on would amount to about twenty-five microseconds. If in such a system, the minimum power-on transmission period is, say, one microsecond (which occurs at or near zero output load current) then, a control range of 25 to 1 is available. For many applications, this control range will be satisfactory.

For reasons of cost and size reduction, factors that are critical in some applications, switching frequencies in the 100–500 kilohertz region are attractive. However at 100 kilohertz, a typical maximum on time, t-on, is one half period, or five microseconds while a typical minimum t-on is say 0.5 microseconds. Thus, only a ten-to-one control range is available. For many applications, this control range is insufficient.

To address this problem, techniques for altering frequency are sometimes used in PWM systems. For example, cycle skipping is used in some cases to extend the control range. If the switching frequency is set to 20, 50 or 100 KHz and the required t-on time for a given set of conditions is less than the minimum system t-on time, then corrective action must be taken. This often involves auxiliary circuitry and control action to maintain the output voltage at the required value by transiently suppressing one or more power transmission cycles. The term "cycle skipping" refers to this action.

Several characteristics of cycle skipping can be troublesome.
1. The number of skipped cycles is not constant.
2. The voltage feedback loop is open for this condition.

Another example of limitations in prior art modulation techniques is found in supplies employing "frequency shift". This technique is sometimes used to provide current limit control of a switching power supply. In a typical converter configuration, the DC output is represented by the equation:

$$V_{dc} = V_{diode} + V_{ir} + V_{load} \quad (2)$$

Where $V_{dc}$ is defined by equation (1), and $V_{diode}$ and $V_{ir}$ are the drops across the output diode and wiring plus component resistances, respectively, and $V_{load}$ is the voltage at the output terminals.

With a load resistance of zero ohms, $V_{load}=0$, $V_{dc}$ must be taken up by the rectifier ($V_{diode}$) and other drops ($V_{ir}$) in the output circuit of the supply. If the short-circuit current is insufficient to satisfy the requirements of equation 2, it will tend to increase until the equation is satisified. This may result in a value of current greatly in excess of design values and may result in supply failure.

One action commonly taken to prevent this, is to increase the base period, $T_p$, (see eq. (1)) to satisfy the control equation. An external circuit is used to charge a capacitor isolated by a diode from the frequency-determining capacitor of the control circuit. When this auxiliary capacitor is charged to a voltage greater than that of the frequency-determining capacitor, it acts to extend the t-off period of the cycle thus lengthening $T_p$. Other circuit designs are employed for the same purpose.

Again this can involve an open loop operating condition and the operating frequency may wander about some value.

An illustration of the auxiliary use of rate control during off-normal conditions such as during start-ups and when overload occurs is found in U.S. Pat. No. 3,733,540 issued to George C. Hawkins. In addition to a pulse-width control loop, a frequency-setting loop is employed to reduce the operating frequency during start-up and overload.

Another illustration of the auxiliary use of rate control in addition to width modulation control is found in U.S. Pat. No. 4,276,586 issued to Antonius Boekhorst. There, rate control is employed in a tuned switching supply to insure that the non-conduction period is substantially constant and exceeds a half cycle of the tuning frequency. To achieve this result, the operating frequency must vary inversely with the duration of the conduction period, i.e., in a direction which attenuates rather than enhancing control.

It can be seen from the foregoing that a high frequency switching supply which provides a stable, wide dynamic control range in a light, compact unit offers significant advantages over the prior art for many applications.

SUMMARY OF INVENTION

It is accordingly an object of the invention to provide a new control technique for switching supplies which yields wide dynamic range, facilitates operation at high frequencies, and eliminates the need for complicated add-ons to address conditions at the extremes of the operating range.

These and other objects are achieved by a control technique for switching supplies which concurrently and continuously integrates pulse width and rate modulation in a closed loop to achieve wide dynamic control. Conditions which require an increase in conduction time produce concomitantly an increase in operating frequency thereby further increasing power transmission to the load. The same enhanced control occurs in the opposite direction when conditions dictate a reduced conduction time.

BRIEF DESCRIPTION OF THE DRAWINGS

Serving to illustrate an explanatory embodiment of the invention are the drawings of which.

DETAILED DESCRIPTION OF THE PREFERRED EMBODIMENT

Figure 1:
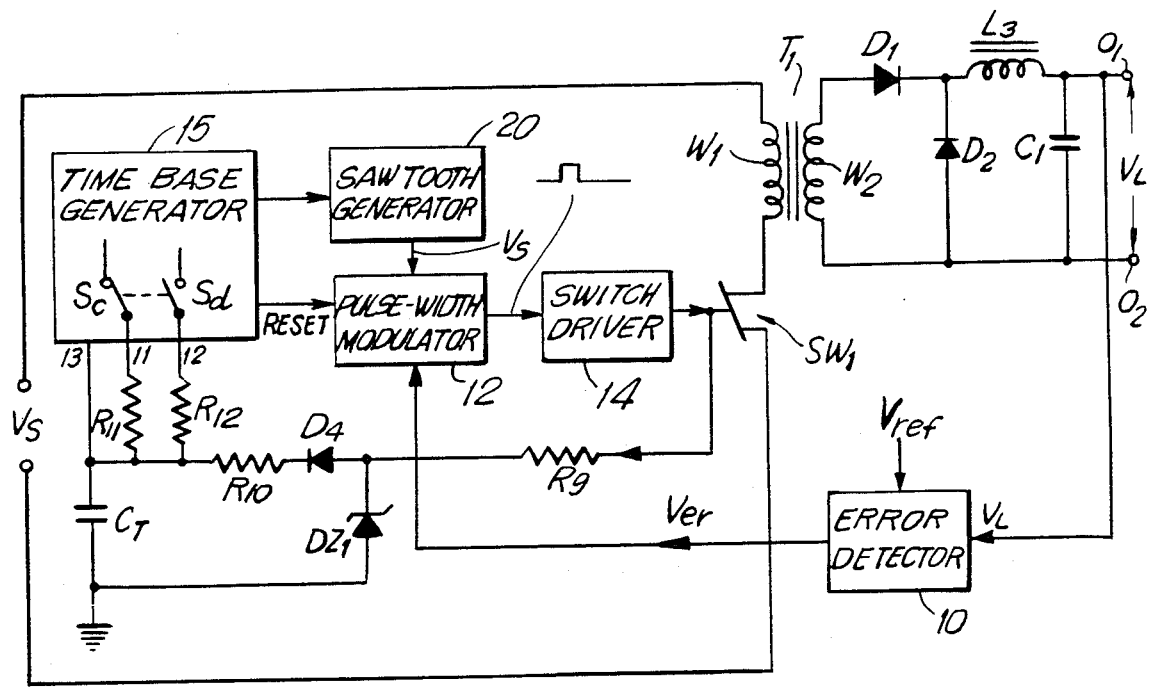
FIG. 1 is a schematic circuit diagram illustrating the control technique of the invention in a single-ended regulated supply.

The circuit of FIG. 1 implements the invention in a single-ended forward converter. The technique has wide application, however, and is not limited to this topology.

As illustrated in FIG. 1 a source voltage, Vs, is applied across the series combination of primary W1 of transformer T1 and a solid state switch e.g. an FET, SW1. As switch SW1 is opened and closed, current pulses flowing in primary W1 induce a voltage across secondary W2. That voltage is applied to a rectifier-filter circuit which includes diodes $D_1$ and $D_2$, choke L3 and output filter capacitor C1.

The resultant voltage, $V_L$, appearing across output terminals 01 and 02, is regulated by controlling the duty cycle switching of SWI in the primary of T1.

To this end, the output voltage, $V_L$, is compared with a reference voltage Vref in an error detector circuit 10. The error signal derived from comparing $V_L$ and Vref, namely Ver is applied to a pulse-width modulator 12. Depending upon the magnitude of the error signal Ver, the pulse output of modulator 12 will have a controllable width which controls the conduction time of switch, SW1, and, therefore, controls the output voltage $V_L$.

This variable width pulse is supplied to switch SW1 via a switch driver 14.

The pulse width modulator receives a sawtooth voltage, $V_s$, from a sawtooth generator 20 (FIG. 1, 2) synchronized to a time base generator 15. When the instantaneous value of the rising voltage $V_s$ reaches a certain level set by a signal $V_e$ related to the error signal (see FIG. 2), the pulse width modulator terminates the pulse Vpm it had been generating. This provides a pulse width which varies as a function of the error signal.

It can be seen from the foregoing that the regulator employs a negative feedback loop to maintain an output voltage, $V_L$, in accordance with the value of the reference voltage Vref.

Unlike conventional pulse width modulators, however, the system of FIG. 1 employs a hybrid modulation in which the time base period, Tp, varies continuously as a function of the width, t-on, of the power transmission pulse.

In the preferred embodiment, the time base generator 15, which synchronizes the modulator sawtooth, has its timing parameters controlled by t-on as well as by its own control time constants. These parameters control the off period of the modulator and, therefore, effect the operating frequency. In the illustrated case, the time base generator is controlled by the width of the pulse delivered by driver 14 to switch SW1. Control is such that as the switch pulse width increases, the time base generator resets the modulator after a shorter time interval. This results in a decreased off period thereby producing a decreased base period, $T_p$, and an increase in operating frequency. The increase provides additional output over that produced by increasing the pulse width alone. A wide control range results.

This also may be seen by noting the action that occurs as power demand is decreased. Under these conditions, the pulse width decreases. This causes the time base generator to take a longer time to reach reset. As a consequence, the off time and, therefore, the base period increases, lowering the operating frequency and causing a still further reduction in output. This enhanced or magnified control results in a wide control range using high frequency magnetics at a reduced operating frequency.

An exemplary circuit for implementing this technique, includes a capacitor $C_T$, FIG. 1, the charging of which is subjected to the effects of the output pulse width from switch driver 14 by way of a circuit which includes resistor $R_9$, diode $D_4$ and resistor $R_{10}$. The latter connects to the junction of $C_T$ and the duty cycle resistors $R_{11}$ and $R_{12}$, both of which are connected to the time base generator along with capacitor $C_T$. The circuit also includes a zener diode $DZ_1$. The base generator may be realized along with the sawtooth generator 20, switch driver 14 and pulse width modulator 12, in an I.C. control chip such as that commercially available as the LAS 4082 supplied by Lambda Semiconductor.

The capacitor charging time (the generator "high" period) is controlled by the combination of $C_T$ and $R_{11}$, and the effects of the feedback from the output of the switch driver. The discharge (reset, i.e., generator "low" period) time is determined by $C_T$ and $R_{12}$.

Figure 2:
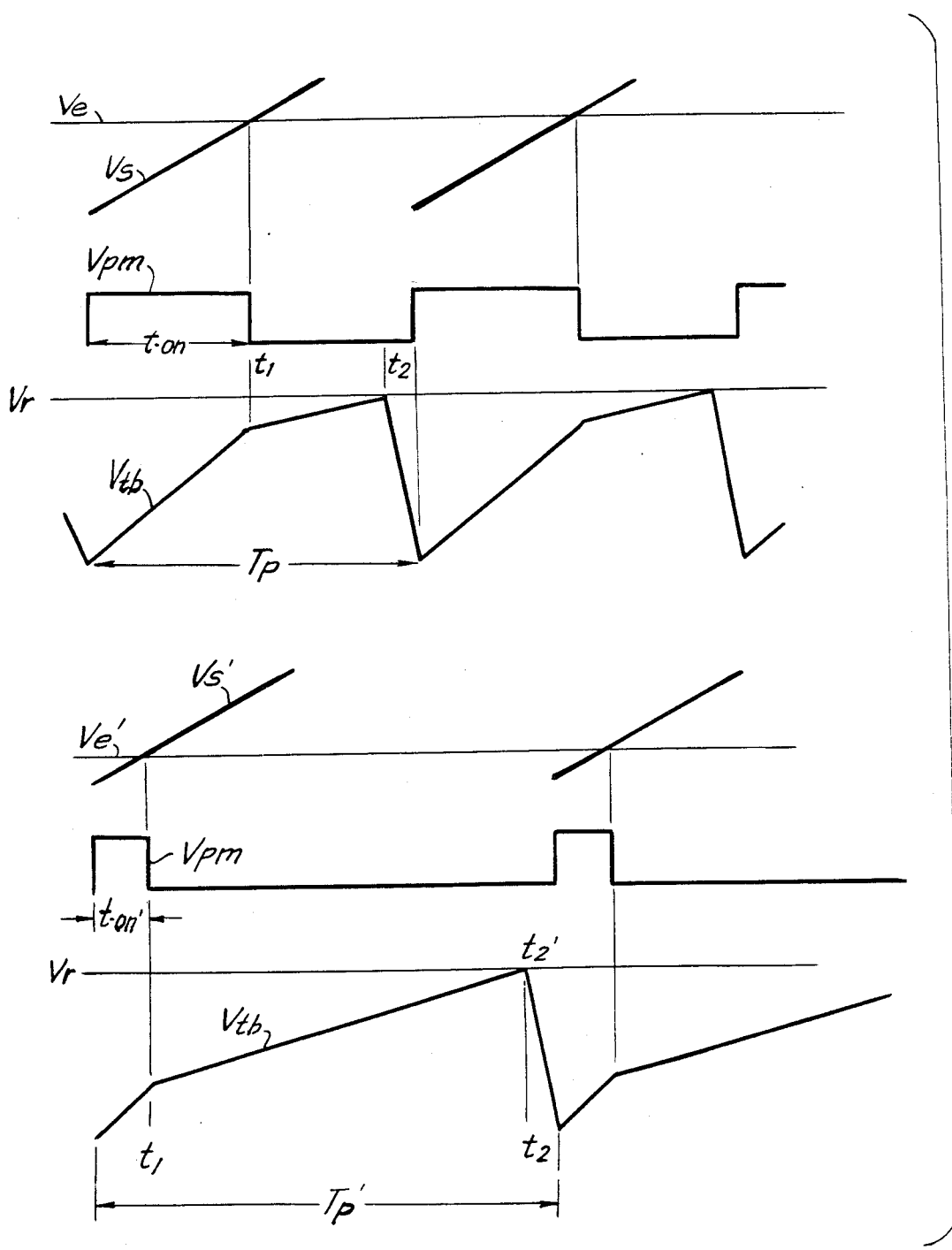
FIG. 2 is a set of idealized wave forms useful in describing the invention.

The wave forms in FIG. 2 illustrate this action for two load conditions.

When the switch driver 14 is on, a resultant voltage, clamped by zener diode $DZ_1$, results in $C_T$ charging not only through $R_{11}$ and switch Sc but also through $R_{10}$ as well producing a relatively rapid rise in $V_{TB}$. See the section of $V_{TB}$ in FIG. 2 which corresponds with t-on.

At the termination of the main switching pulse $V_{PM}$, this charging circuit is deenergized and capacitor $C_T$ then continues to charge through resistor $R_{11}$ and Sc at a lesser rate. See the interval from $t_1$ to $t_2$ in FIG. 2. When $V_{TB}$ reaches the reset level $V_r$, Sc opens and switch Sd closes; capacitor $C_T$ then discharges rapidly by way of resistor $R_{12}$ producing the retrace shown in FIG. 2. At the termination of the reset, a new cycle begins.

To illustrate the range of control, another set of conditions is also portrayed in FIG. 2 in which $V_{PM}$ is on for a period, t-on'. $V_{TB}$ charges as before as indicated. At the termination of t-on', capacitor $C_T$ begins to charge at its lower rate finally intersecting the reset control level, $V_r$, at time $t_2'$. Reset then occurs after which a new cycle begins. Note in this latter case that the decrease in conduction time to t-on' is accompanied by an increase in the total base period to Tp' and thus a decrease in the operating frequency.

As can be seen by comparing the two conditions illustrated in FIG. 2, a change in pulse width in the increasing direction produces an accelerating effect because frequency also increases. A decrease in pulse width produces an even larger reduction in output then would otherwise be the case, because the operating frequency decreases.

It should be emphasized that there are many other ways to achieve the desired effect. The time parameters can be controlled by controlling slope or amplitude conditions or both or by digital counting and timing or combinations of all these techniques.

What is claimed is:

1. A switching type power supply comprising a controllable switching device and an output circuit serially connected to a source to be regulated; pulse width regulator means responsive to the output of said output circuit for controlling the pulse width applied to said switching device; frequency control means controlled in accordance with said pulse width for extending the effect of said pulse width control by controlling the switching frequency of said device in relation to said pulse width such that the switching frequency increases as pulse width increases.

2. A supply as defined in claim 1 in which said regulating means and frequency control means form a negative feedback loop.

3. A supply as defined in claim 1 in which said frequency control means are coupled to said switching device for deriving pulse width data used for said frequency control.

4. A supply as defined in claim 1 in which said frequency control means are coupled to said pulse width regulating means for controlling the base period thereof.

5. A supply as defined in claims 2, 3 or 4 in which said frequency control means comprise a time base generator.

6. A switching type power supply comprising a power transmitting transformer, switching means connected in series with the primary of said transformer, said primary and switching means being connected to a voltage source; an output circuit including rectifying and filtering means connected to a secondary of said transformer; error detector means responsive to the output of said output circuit for deriving a control signal related to changes in said output; switch control means responsive to said control signal and having a characteristic whereby changes in the amplitude of said control signal over the operating range of said supply produce changes in both the conduction time of said switching means and the operating frequency of said switching means; said switch control means including a pulse width modulating means for controlling the conduction time of said switching means and timing means to cause the operating frequency to increase as the pulse width increases and to decrease as the pulse width decreases.

* * * * *